United States Patent
Buettgen

(10) Patent No.: US 10,401,496 B2
(45) Date of Patent: Sep. 3, 2019

(54) OPTOELECTRONIC MODULES OPERABLE TO COLLECT DISTANCE DATA VIA TIME-OF-FLIGHT AND TRIANGULATION

(71) Applicant: ams Sensors Singapore Pte. Ltd., Singapore (SG)

(72) Inventor: Bernhard Buettgen, Adliswil (CH)

(73) Assignee: ams Sensors Singapore Pte. Ltd., Singapore (SG)

(*) Notice: Subject to any disclaimer, the term of this patent is extended or adjusted under 35 U.S.C. 154(b) by 407 days.

(21) Appl. No.: 15/240,146

(22) Filed: Aug. 18, 2016

(65) Prior Publication Data

US 2017/0090020 A1  Mar. 30, 2017

Related U.S. Application Data

(60) Provisional application No. 62/234,815, filed on Sep. 30, 2015.

(51) Int. Cl.
| | | |
|---|---|---|
| *G01C 3/08* | (2006.01) | |
| *G01S 17/36* | (2006.01) | |
| *G01S 17/48* | (2006.01) | |
| *G01S 7/491* | (2006.01) | |

(52) U.S. Cl.
CPC ............ *G01S 17/36* (2013.01); *G01S 7/4915* (2013.01); *G01S 17/48* (2013.01)

(58) Field of Classification Search
CPC ......... G01S 17/36; G01S 17/48; G01S 7/4915
USPC ........................................... 356/5.01
See application file for complete search history.

(56) References Cited

U.S. PATENT DOCUMENTS

| | | | |
|---|---|---|---|
| 6,624,899 B1 | 9/2003 | Clark | |
| 7,728,957 B2 * | 6/2010 | Haase | ................ G01C 3/085 356/3.01 |
| 8,754,939 B2 | 6/2014 | Oggier et al. | |
| 9,047,519 B2 | 6/2015 | Schuler et al. | |
| 10,061,028 B2 * | 8/2018 | Koppal | ............... G01S 17/89 |
| 2007/0034778 A1 | 2/2007 | Lustenberger et al. | |
| 2012/0026294 A1 | 2/2012 | Rothenberger et al. | |
| 2013/0148102 A1 | 6/2013 | Oggier | |
| 2015/0130902 A1 | 5/2015 | Fossum et al. | |

(Continued)

FOREIGN PATENT DOCUMENTS

| | | |
|---|---|---|
| AT | 405107 | 5/1999 |
| AT | 514218 | 11/2014 |
| DE | 10113641 | 10/2002 |

(Continued)

OTHER PUBLICATIONS

Büttgen, B. et al., "Robust Optical Time-of-Flight Range Imaging Based on Smart Pixel Structures", IEEE Transactions on Circuits and Systems I: Regular Papers (2008), 55(6):1512-1525.

(Continued)

*Primary Examiner* — Mark Hellner
(74) *Attorney, Agent, or Firm* — Fish & Richardson P.C.

(57) ABSTRACT

An optoelectronic module operable to collect distance data via a time-of-flight mode and a time-of-flight-triangulation mode includes an illumination assembly and an imaging assembly. The imaging assembly includes at least one demodulation pixel operable to determine distance to an object via a time-of-flight mode and a time-of-flight-triangulation mode. Multi-path distance inaccuracies can be mitigated in some implementations.

18 Claims, 11 Drawing Sheets

(56) References Cited

U.S. PATENT DOCUMENTS

2015/0268333 A1    9/2015  Schneider et al.

FOREIGN PATENT DOCUMENTS

| EP | 1152261 | 11/2001 |
|---|---|---|
| EP | 2413159 | 2/2012 |
| WO | WO 2013/091016 | 6/2013 |
| WO | WO 2015/136099 | 9/2015 |

OTHER PUBLICATIONS

Kadambi, A. et al., "Coded time of Flight Cameras: Sparse Deconvolution to Address Multipath Interference and Recover Time Profiles", ACM Transaction on Graphics (2013) 32(6), Article 167, pp. 167:1-167:10.

Nemecek, A. et al., "Distance Measurement Line Sensor with PIN Photodiodes", $5^{th}$ IEEE Conference on Sensors, Daegu (2006), pp. 275-278.

Sgrott, O. et al., "A 134-pixel CMOS Sensor for Combined Time-of-Flight and Optical Triangulation 3-D Imaging", ESSCIRC '09 Proceedings of, Athens (2009), pp. 208-211.

Simoni, A. et al., "Integrated Optical Sensors for 3-D Vision," Sensors, Proceedings of IEEE (2002), vol. 1, pp. 1-4.

Stoppa, D. et al., "A New Architecture for TOF-based Range-finding Sensor", Sensors, Proceedings of IEEE (2004), p. 481-484.

\* cited by examiner

OPTOELECTRONIC MODULES OPERABLE TO COLLECT DISTANCE DATA VIA TIME-OF-FLIGHT AND TRIANGULATION

TECHNICAL FIELD

This disclosure relates to triangulation-based distance measurements accomplished with demodulation pixels as employed in time-of-flight-based optoelectronic modules.

BACKGROUND

Time-of-flight (TOF) is a technique used to determine the distance to an object or objects in a three-dimensional scene. Further the technique can be used to construct three-dimensional representations of an object or a three-dimensional scene. TOF-based optoelectronic modules frequently employ a modulated light source, a series of optical elements, and a demodulation pixel or demodulation pixel array. Modulated light projected from a modulated light source onto an object in a scene may be reflected to an imaging assembly and focused onto a demodulation pixel. The demodulation pixel and supporting circuitry, may detect a phase shift in the reflected light, wherein the phase shift may be further correlated to the distance the light traveled; specifically, the detected phase shift is the phase shift in the modulated light that transpires when the modulated light travels from the light source to the object and is reflected back to the TOF module. Accordingly, the phase shift (i.e., phase delay) is proportional to the transit time as expressed below:

$$t_{tof} = -\frac{\phi_{tof}}{2\pi f_{mod}}$$

where $t_{tof}$ is the time-of-flight, $\phi_{tof}$ is the phase shift of the modulated light signal, and the respective modulation frequency is $f_{mod}$. The distance to the object ($R_{tof}$) can then be calculated according to the following:

$$R_{tof} = \frac{t_{tof} \cdot c}{2}$$

where c is the speed of light. Alternatively, the round trip time can be directly measured in order to calculate the distance to the object.

Other techniques may be employed for determining distances to objects in a scene such as triangulation. Triangulation-based optoelectronic modules often use a light source, a series of optical elements, and a pixel array. As above, light projected from the light source and reflected by an object in a scene may be focused onto the pixel array via the optical elements. Distance to the object then is determined via a standard triangulation technique where distance is determined from the focal length (i.e., on-axis focal length) of the series of optical elements, the position of the pixel on which the reflected light is focused (e.g., as a spot), and the baseline distance between the optical axis (co-axial with the on-axis focal length) and the illumination source. A conventional triangulation equation is described below wherein $R_{tri}$ is the distance information obtained by the triangulation measurement; f is the on-axis focal length; b is baseline; $x_{pix}$ is the location of the pixel on which the reflected light is focused (e.g., a spot of light) from the optical axis (co-axial with the on-axis focal-length); α is the angle between the emitted signal and the measurement axis:

$$R_{tri} = \frac{f \cdot b}{x_{pix} + f \tan(\alpha)}$$

Further, if α=0 the formula simplifies to $R_{tri}=(f \times b)/x_{pix}$.

The TOF approach can yield superior distance data for some applications while the triangulation approach may be better suited to other applications. For example, applications that require distance measurements of about 1 cm or less can be well-suited to optoelectronic modules that employ the triangulation approach while applications that require distance measurements greater than about 1 cm can be well-suited to optoelectronic modules that employ the TOF approach as described above. The distance resolution of both the TOF and triangulation approached outlined above is limited in part by the pixel array resolution. Further, distance resolution is inaccurate to the extent that the pixel, on which light is focused, is of finite dimensions. Light may be focused on the center or edge of the pixel, for example, but this physical difference in focused-light position is not considered in state-of-the-art TOF or triangulation approaches.

Moreover, the TOF approach can suffer from multi-path measurement inaccuracies. For example, modulated light incident on an object may reflect from multiple surfaces at respective different distances; accordingly, different phase shifts may be recorded for the same object obfuscating its true distance. Accordingly, an approach needs to be implemented in order to mitigate multi-path measurement inaccuracies and to improve distance resolution as outlined above.

SUMMARY

This disclosure describes TOF-based optoelectronic modules operable to measure distance data via a TOF mode and a TOF-triangulation mode in order to improve distance data resolution and/or mitigate measurement inaccuracies, such as multi-path measurement inaccuracies.

For example, in one aspect, an optoelectronic module is operable to capture distance data using a time-of-flight mode and operable to capture distance data using a time-of-flight-triangulation mode. The optoelectronic module includes an illumination assembly, an imaging assembly, and a processor. The illumination assembly is operable to generate an illumination on an object at an object distance, wherein the illumination is modulated with a modulation frequency. The imaging assembly has an optics assembly and a demodulation pixel. The optics assembly has an optical axes and an on-axis focal-length, wherein the optical axis is disposed at a baseline from the illumination assembly. The demodulation pixel is separated from the optics assembly by an on-axis focal-length. The imaging assembly is operable to collect a portion of the illumination light reflected from the object, wherein a portion of the reflected light is focused on the demodulation pixel at a location of initial charge-carrier generation, the portion of the reflected light focused on the demodulation pixel forming a plurality of charges. The module is arranged such that a portion of the plurality of charges are conducted from the location of initial charge-carrier generation to a demodulation assembly, the distance between the location of initial charge-carrier generation and the demodulation assembly being an intra-pixel distance, wherein the portion of the plurality of charges conducted to the demodulation assembly over the intra-pixel distance produce a signal that has a phase change. The processor is operable to correlate the phase change to the intra-pixel distance, is operable to correlate the intra-pixel distance to the object distance via the time-of-flight-triangulation mode, and is operable to correlate the phase change to the object distance via the time-of-flight mode.

In another aspect, a method of determining distance to an object using an optoelectronic module includes illuminating an object at a distance from the optoelectronic module using modulated illumination, collecting, in the module, light reflected from the object, wherein at least a portion of the reflected light is focused on a demodulation pixel in the module to produce a plurality of charges, and conducting the plurality of charges over an intra-pixel distance to a demodulation assembly in the module to produce a signal having a phase change. The phase change is correlated to the object distance via a time-of-flight-triangulation mode, and the phase change is correlated to the object distance via a time-of-flight mode.

Other aspects, features and advantages will be readily apparent from the following detailed description, the accompanying drawings, and the claims.

BRIEF DESCRIPTION OF THE DRAWINGS

FIG. 4A FIGS. 4C and 4D depict example illuminations operable for the TOF-triangulation mode and TOF mode, respectively.

DETAILED DESCRIPTION

Figure 1A:
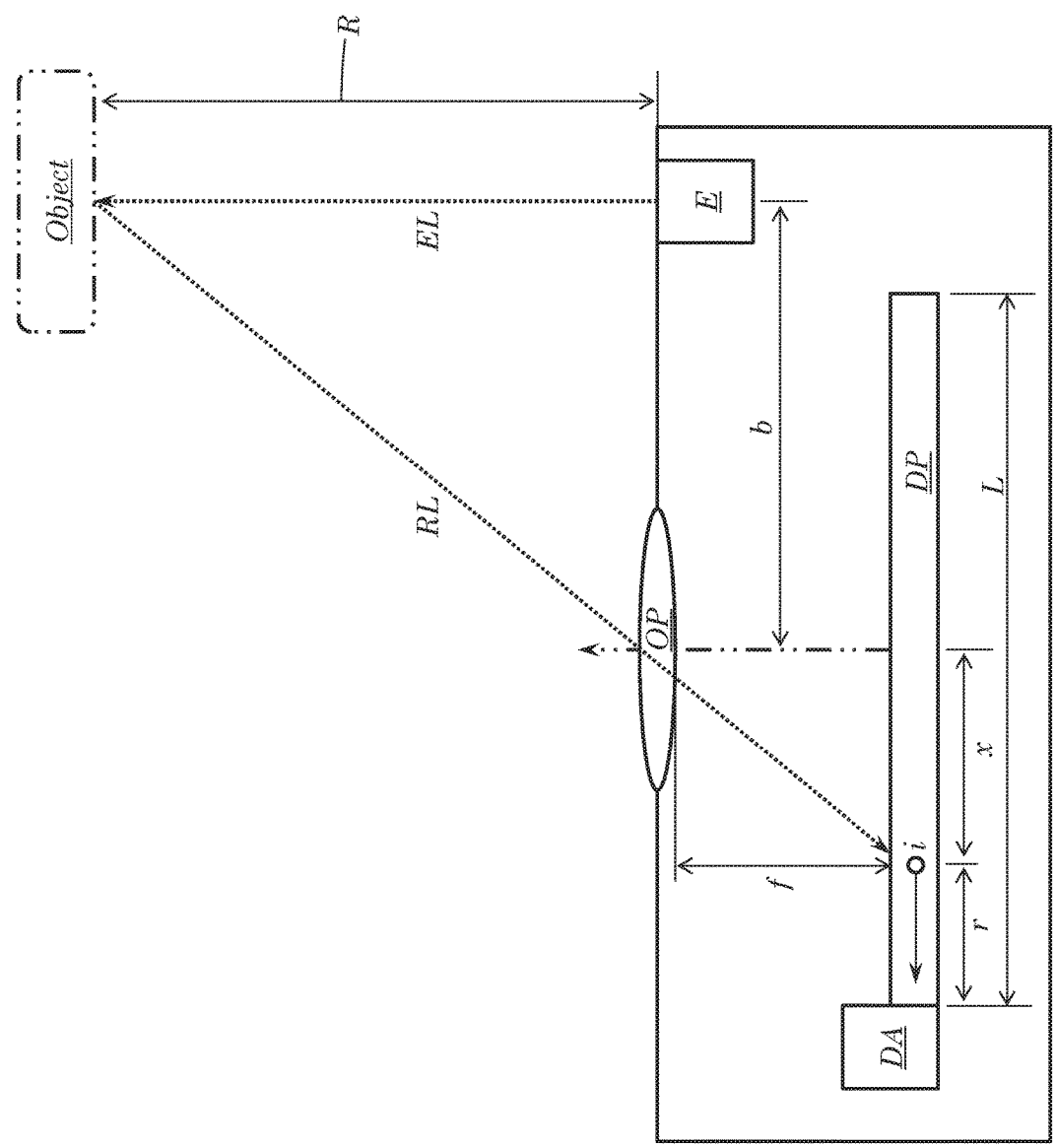
FIG. 1A depicts an example of an optoelectronic module illustrating a TOF-triangulation mode for acquiring distance data.

FIG. 1A illustrates the principles of the TOF-triangulation mode using a single demodulation pixel. A schematic of an optoelectronic module is depicted. The optoelectronic module includes an emitter E, an optical element OP, and a demodulation pixel DP having a lateral dimension L. The demodulation pixel DP includes a demodulation assembly DA. The optical element OP is positioned at a distance from the demodulation pixel DP substantially equal to the on-axis focal-length f of the optical element. The emitter E is laterally separated from an optical axis (co-axial with the on-axis focal-length j) by a baseline distance b. The opto-electronic module is positioned at a distance R from an object. The emitter E is configured to generate emitted light EL with a particular modulation frequency $f_{mod}$. Emitted light EL generated from the emitter E is incident on the object. In the example implementation depicted in FIG. 1A, the emitted light EL is depicted as a single point (incident on the object); however, in this and other implementation (for example, the following implementations) the emitted light EL can include a plurality of points such as a pattern of points. Reflected light RL is focused via the optical element OP. The optical element OP focuses light on the demodulation pixel DP at a location of initial charge-carrier generation i, wherein charge carriers are generated. The location of initial charge-carrier generation i is positioned at a distance x (i.e., an optical-axis-to-charge distance) from the optical axis (co-axial with the on-axis focal-length j). Further, the charge carriers are conducted via a drift field $E_D$ (not depicted for clarity) through the demodulation pixel DP over a distance r (i.e., the intra-pixel distance r) to the demodulation assembly DA forming a signal.

In a typical TOF approach, a phase shift $\phi_{tof}$ of the light focused on the demodulation pixel DP can be conventionally ascribed to the distance the emitted light EL and reflected light RL traveled and can be described accordingly:

$$\varphi_{tof} = 2\pi f_{mod} t_{tof} \Rightarrow \varphi_{tof} = \frac{4\pi f_{mod}}{c} R \qquad \text{eq. 1}$$

where c is the speed of light and $t_{tof}$ is the time of light.

The a demodulation pixel, however, can also be operable to determine the distance R via a TOF-triangulation approach since charges conducted through the demodulation pixel DP also experience a phase shift ($\phi_{tri}$) over the distance the charges are conducted through the demodulation pixel DP (i.e., the intra-pixel distance r as depicted in FIG. 1A). The phase shift $\phi_{tri}$ incurred by the signal over the intra-pixel distance r is described below:

$$\phi_{tri} = \frac{2\pi f_{mod}}{\mu E_D} r \qquad \text{eq. 2}$$

where $$\phi_{tri} = 2\pi f_{mod} t_{tri},$$

$$t_{tri} = \frac{r}{\mu E_D},$$

and $t_{tri}$ is the time it takes for the charges to be conducted over the intra-pixel distance r, $\mu$ is the mobility, $E_D$ is the drift field, and as mentioned above r is the intra-pixel distance the charges generated at the location of initial charge-carrier generation i must travel to reach the demodulation assembly DA. The phase shift $\phi_{tri}$ can be measured according to techniques known to a person of ordinary skill in the art to which this disclosure pertains in light of the disclosure herein. Further, since charge-carrier mobility, modulation frequency, electric field are known parameters (or can be known), the intra-pixel distance r can be determined.

Further, since the baseline distance b, the lateral dimension L of the demodulation pixel DP, and the on-axis focal length f are also known parameters, the distance R to the object can be determined via the principles of triangulation and the phase-shift ($\phi_{tri}$) according to the following equation:

$$\phi_{tri} = \frac{2\pi f_{mod}}{\mu E_D}\left(\frac{L}{2} - \frac{f \cdot b}{R} + f\tan(a)\right) \qquad \text{eq. 3}$$

$$\text{where} = \frac{f \cdot b}{R} - f\tan(a),$$

$$r = \frac{L}{2} - x,$$

and R is the distance to the object. In some implementations when the angle α is zero (as in the optoelectronic module depicted in FIG. 1A), equation 3 can be reduced to:

$$\phi_{tri} = \frac{2\pi f_{mod}}{\mu E_D}\left(\frac{L}{2} \cdot \frac{f \cdot b}{R}\right) \qquad \text{eq. 4}$$

Therefore, the schematic optoelectronic module depicted illustrated in FIG. 1A can be operable to determine the distance R to the object via two approaches or modes: The TOF mode (e.g., as described above in association with equation 1) and the TOF-triangulation mode (e.g., as described above in association with equation 3 and/or equation 4). The two modes can provide more accurate distance measurements in some instances. For example, the multi-path measurement inaccuracies described above can be substantially mitigated or even eliminated by using both modes to determine the distance R to an object in some instances. For example, those implementations that employ emitted light including a plurality of points, wherein a plurality of points is incident on the object and focused on the demodulation pixel can be implemented to resolve and/or mitigate various multi-path measurement inaccuracies. Further, various parameters can be tuned to optimize collection of phase shift data such that in some instances the parameters can be tuned for optimal phase-shift data collection ($\phi_{tof}$) via the TOF-mode while in other instances the parameters can tuned for optimal phase-shift data collection via the TOF-triangulation mode ($\phi_{tri}$). The instances, e.g., various object distance ranges, reflectivity, environments (e.g., with multiple objects), where one or both the TOF mode and TOF-triangulation mode would proffer an advantage would be apparent to a person of ordinary skill in the art to which this disclosure pertains in light of the present disclosure.

Figure 1B:
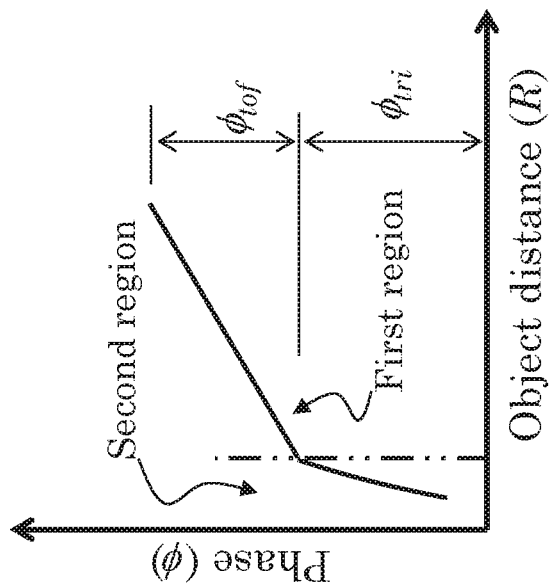
FIGS. 1B and 1C depict example plots of the phase-shift verses distance data that can be collected by the optoelectronic module depicted in FIG. 1A.
Figure 1C:
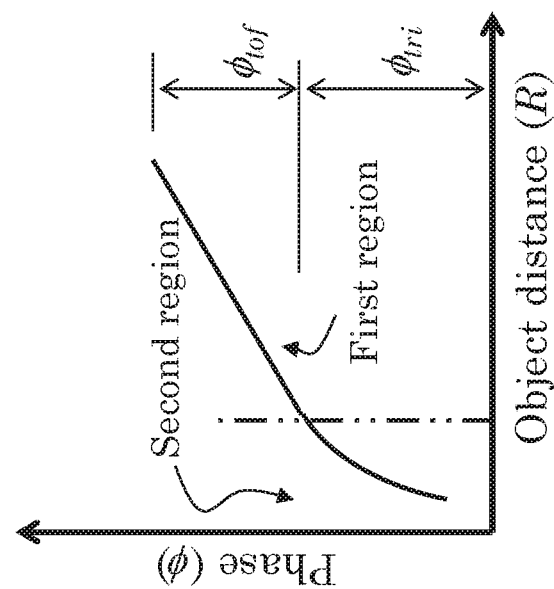

FIG. 1B illustrates an example plot of the phase-shift data ($\phi_{tof}$ and $\phi_{tri}$) that can be collected by the demodulation pixel DP for corresponding object distances R. The example plot can be divided into two regions: The first phase-change region (on the right-hand side) is dominated by phase-shift data $\phi_{tof}$ corresponding to e.g., equation 1 above; and the second phase-change region (on the left-hand side) is dominated by phase-shift data $\phi_{tri}$ corresponding to e.g., equations 2-4 above. Each region can be optimized by tuning various parameters as disclosed above. For example the drift field $E_D$ can be modified (e.g., reduced in magnitude) such that the slope of the second phase-change region is increased as illustrated in FIG. 1C. An increase in the slope can minimize noise (e.g., in the distance domain) in some implementations; therefore, modification of the drift field $E_D$ can optimize measurement of the distance R to the object via the TOF-triangulation mode. In another instance, the modulation frequency ($f_{mod}$) can be modified such that the slope of the first phase-change region is increased. As above, an increase in the slope can minimize noise (e.g., in the distance domain) in some implementations; therefore, modification of the modulation frequency can optimize measurement of the distance R to the object via the TOF mode.

Figure 1D:
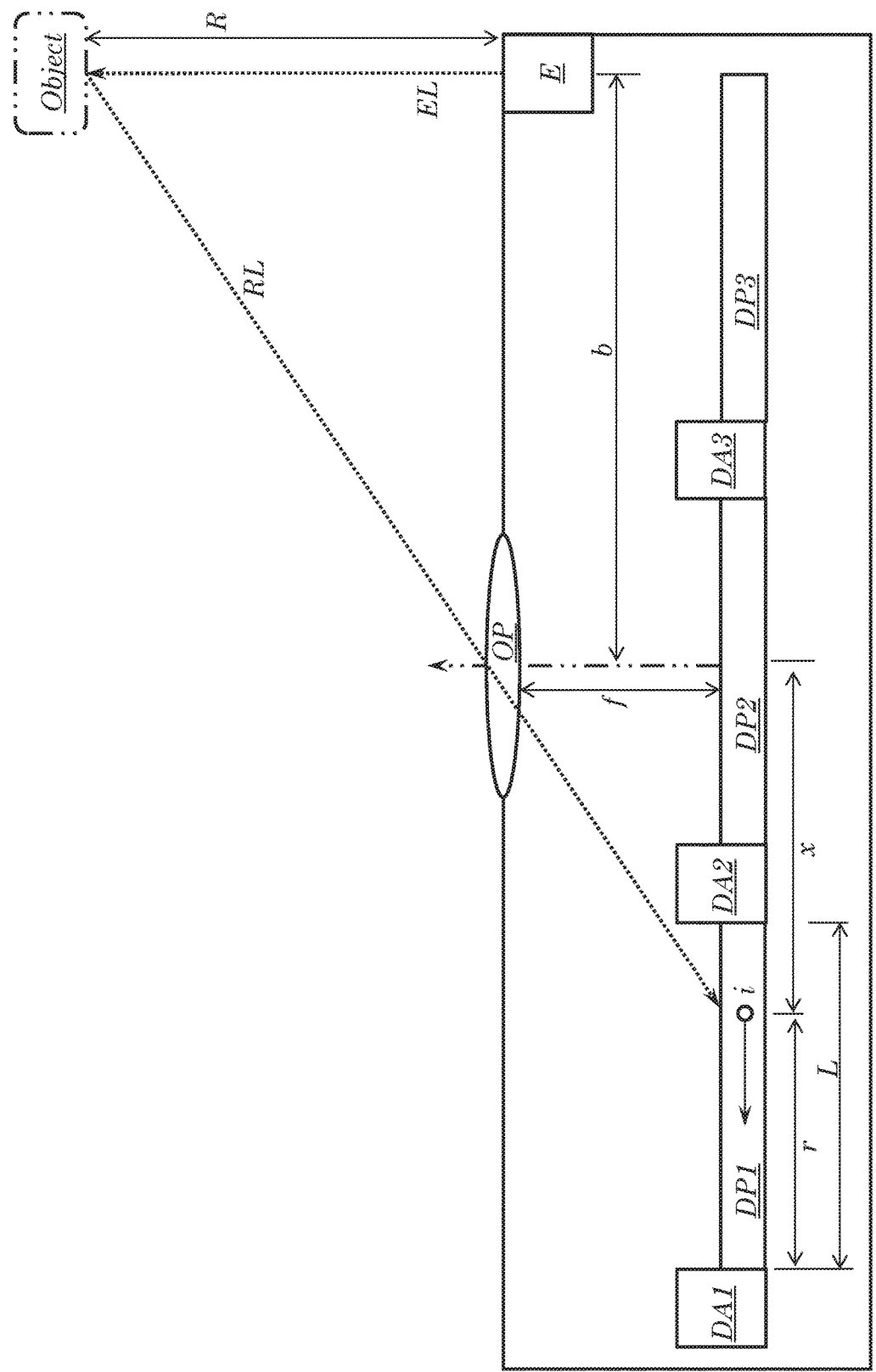
FIG. 1D depicts another example of an optoelectronic module illustrating a TOF-triangulation mode for acquiring distance data.

FIG. 1D illustrates the principles of the TOF-triangulation mode using an array of demodulation pixels. A schematic of an optoelectronic module is depicted. The optoelectronic module includes the components described above and further includes an array of demodulation pixels DP1-DP3 each with respective demodulation assemblies DA1-DA3. The principles described above can be extended to implementations including an array of demodulation pixels. Accordingly, assuming the angle α is zero (as depicted in in FIG. 1D) the equation describing the phase shift $\phi_{tri}$ can be reduced to:

$$\phi_{tri} = \frac{2\pi f_{mod}}{\mu E}\left(\frac{3L}{2} - \frac{f \cdot b}{R}\right) \qquad \text{eq. 4}$$

Therefore, the schematic optoelectronic module illustrated in FIG. 1D can be operable to determine the distance R to the object via the TOF mode and the TOF-triangulation mode. That is, phase-shift data corresponding to the TOF mode ($\phi_{tof}$) and the TOF-triangulation mode ($\phi_{tri}$) can be collected by demodulation pixels DP1-DP3. The phase shift data ($\phi_{tof}$, $\phi_{tri}$) from each demodulation pixel can (if plotted with respect to object distance R as described above) be divided into two regions as described above. Each region can be optimized by tuning various parameters as described above. Accordingly, each demodulation pixel can be optimized either for distance data acquisition via a TOF mode and/or a TOF-triangulation mode. Other implementations are further disclosed in the detailed description (and corresponding figures) below.

Figure 2:
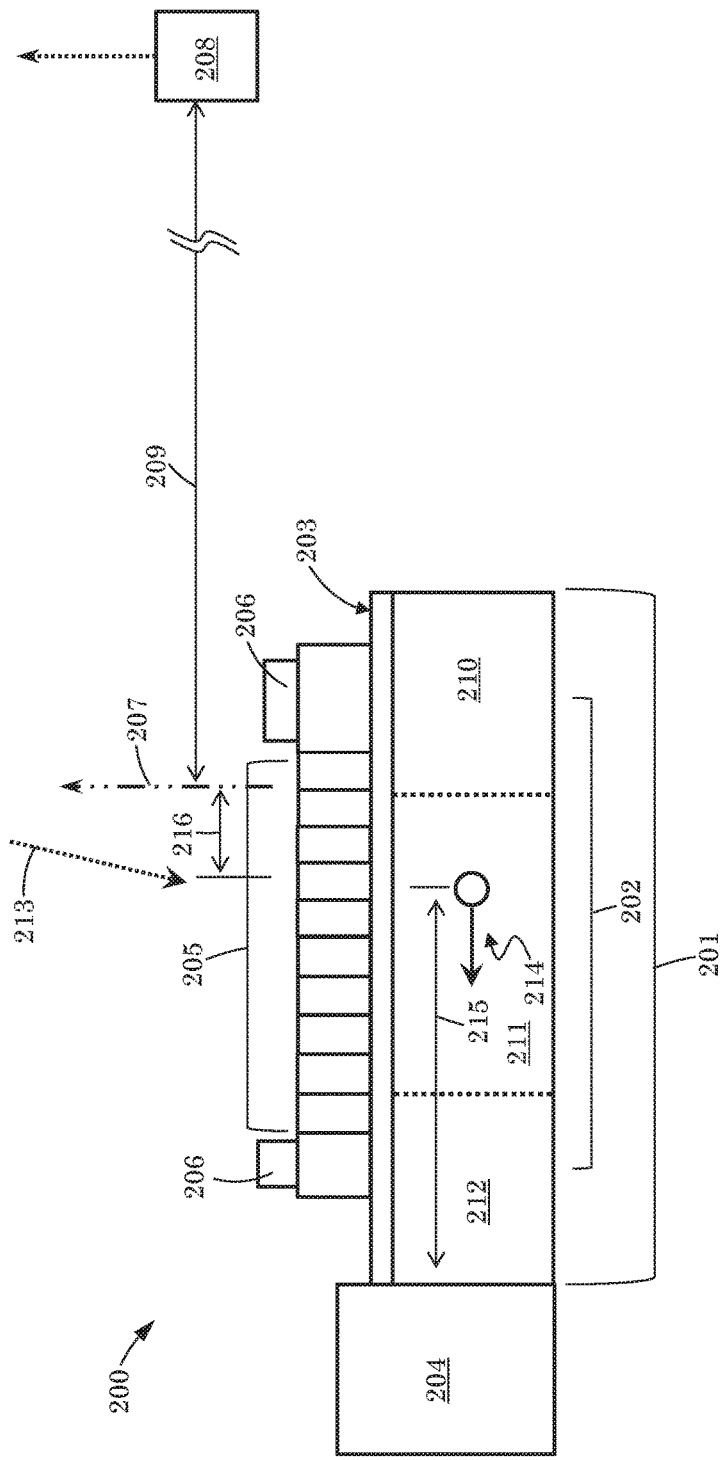
FIG. 2 depicts a demodulation pixel employed to collect distance data via a TOF-triangulation mode and a TOF mode.

FIG. 2 illustrates an optoelectronic module operable to measure an object distance R via the TOF and TOF-triangulation modes according to the principles described above and illustrated in FIG. 1A-FIG. 1C. FIG. 2 depicts a static drift field demodulation pixel 200 as described in U.S. Pat. No. 7,884,310, though other implementations can incorporate different types of demodulation pixels. The example demodulation pixel 200 includes a semiconductor substrate 201, and a photosensitive detection region 202, an insulator layer 203, and a demodulation assembly 204. The photosensitive detection region 202 includes a series of gates 205 and contact nodes 206. The demodulation pixel 200 is adjacent to an optical axis (co-axial with an on-axis focal-length 207) and an emitter 208. The emitter 208 is operable to emit light with a certain modulation frequency ($f_{mod}$). The optical axis (co-axial with the on-axis focal-length 207) and the emitter 208 are separated by a baseline distance 209 (depicted as b is FIG. 1A). Potential is applied to the contact nodes of the demodulation pixel 200 such that regions of various potentials arise. In this example, the demodulation pixel 200 includes a region of high potential 210, a region of decreasing potential 211, and a region of low potential 212. Electromagnetic radiation 213 incident on the photosensitive detection region 202 generates photo-generated charge carriers in a region of initial charge-carrier excitation 214. Charge-carriers are conducted to the demodulation assembly 204 via a drift field ($E_D$ as described above) within the decreasing potential region 211 forming a signal. The distance between the location of initial charge-carrier excitation 214 (i as described above) and the demodulation assembly 204 defines an intra-pixel distance 215 (r as described above). The optical-axis-to-charge distance 216 (x as depicted in FIG. 1A) is defined as the distance between the location of initial charge-carrier excitation 214 and the optical axis (co-axial with the on-axis focal length 207). The phase of the signal (generated in the semiconductor substrate 201 at the location of initial charge-carrier excitation 214) undergoes a phase change ($\phi_{tri}$) as it is conducted to the demodulation assembly 204 as described above, wherein the phase change is directly correlated with the intra-pixel distance 215 (depicted as r in FIG. 1A). The phase change ($\phi_{tri}$) of the signal can be determined via the demodulation assembly 204 as would be apparent to a person of ordinary skill in the art to which this discloser pertains in light of the present disclosure. Further, since the baseline 209 (the distance separating the optical axis co-axial with the on-axis focal-length 207 and the emitter 208) is known, the distance to an object can be determined via the TOF-triangulation mode as decided above. Moreover, in other instances, the demodulation pixel 200 can be operable to collect distance data to an object via the TOF mode as described above. The TOF-triangulation mode can proffer an advantage in some implementations, for example, the implementation depicted in FIG. 2. The example implementation depicted in FIG. 2 includes a single pixel, and singe-pixel optoelectronic modules often exhibit limited resolution. The resolution is not limited in the example implementation depicted in FIG. 2, however, since the TOF-triangulation mode can be employed to acquire distance data as described above. Accordingly, in some implementations, this advantage could obviate the need for an array and/or a large number of pixels.

Figure 6:
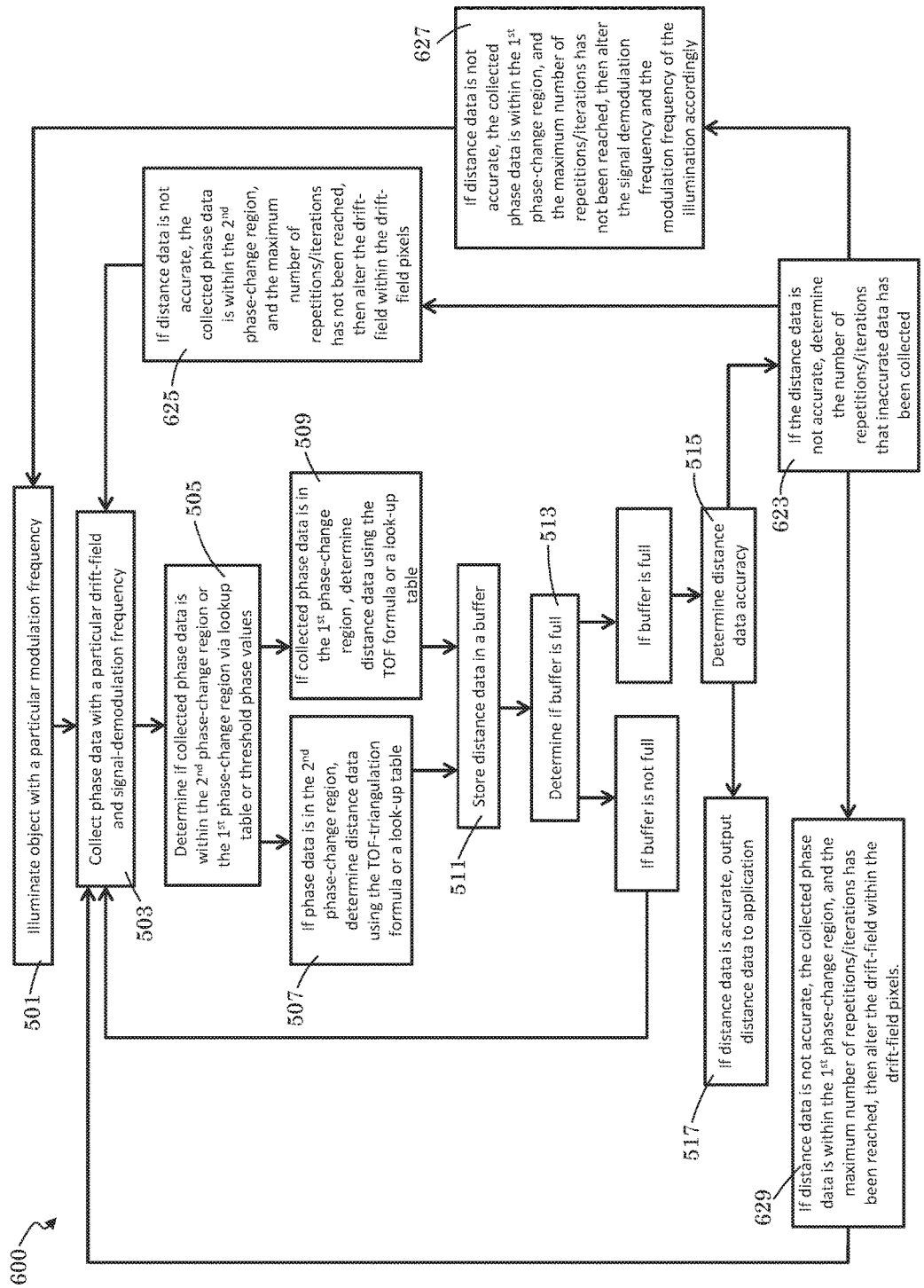
FIG. 6 depicts additional and/or alterative steps that modify the example process-flow diagram depicted in FIG. 5.

As described above, the demodulation pixel 200 (as depicted in FIG. 2) can be optimized for optimal phase-change data collection via the TOF and/or TOF-triangulation modes (as depicted in FIG. 1B and FIG. 1C). For example, the drift-field generated in the semiconductor substrate 201 can be optimized for the TOF-triangulation mode. In such an example, the difference in potentials between the regions of high potential 210 and low potential 212 could be decreased such that the region of decreasing potential 211 had a smaller gradient. Accordingly, the slope of the second phase-change region (e.g., as depicted in FIG. 1C) could be reduced proffering certain benefits for TOF-triangulation data collection (e.g., reduced noise in the distance domain). Further, in some implementations the demodulation pixel 200 can be optimized for the TOF mode as described above. For example, the modulation frequency can be modified such that the slope of the first phase-change region is increased. As above, an increase in the slope can minimize noise (e.g., in the distance domain) in some implementations; therefore, modification of the modulation frequency can optimize measurement of the distance R to the object via the TOF mode. Further, both the TOF mode and the TOF-triangulation mode can be used in a particular situation so as to solve the multi-path measurement inaccuracies described previously. That is, while the TOF mode can suffer multi-path measurement inaccuracies in some applications, the TOF-triangulation mode can be used to crosscheck, verify data derived from the TOF mode. Example steps for operating an optoelectronic module in both TOF and TOF-triangulation modes in order to overcome multi-path measurement inaccuracies is described below (FIG. 6).

Figure 3A:
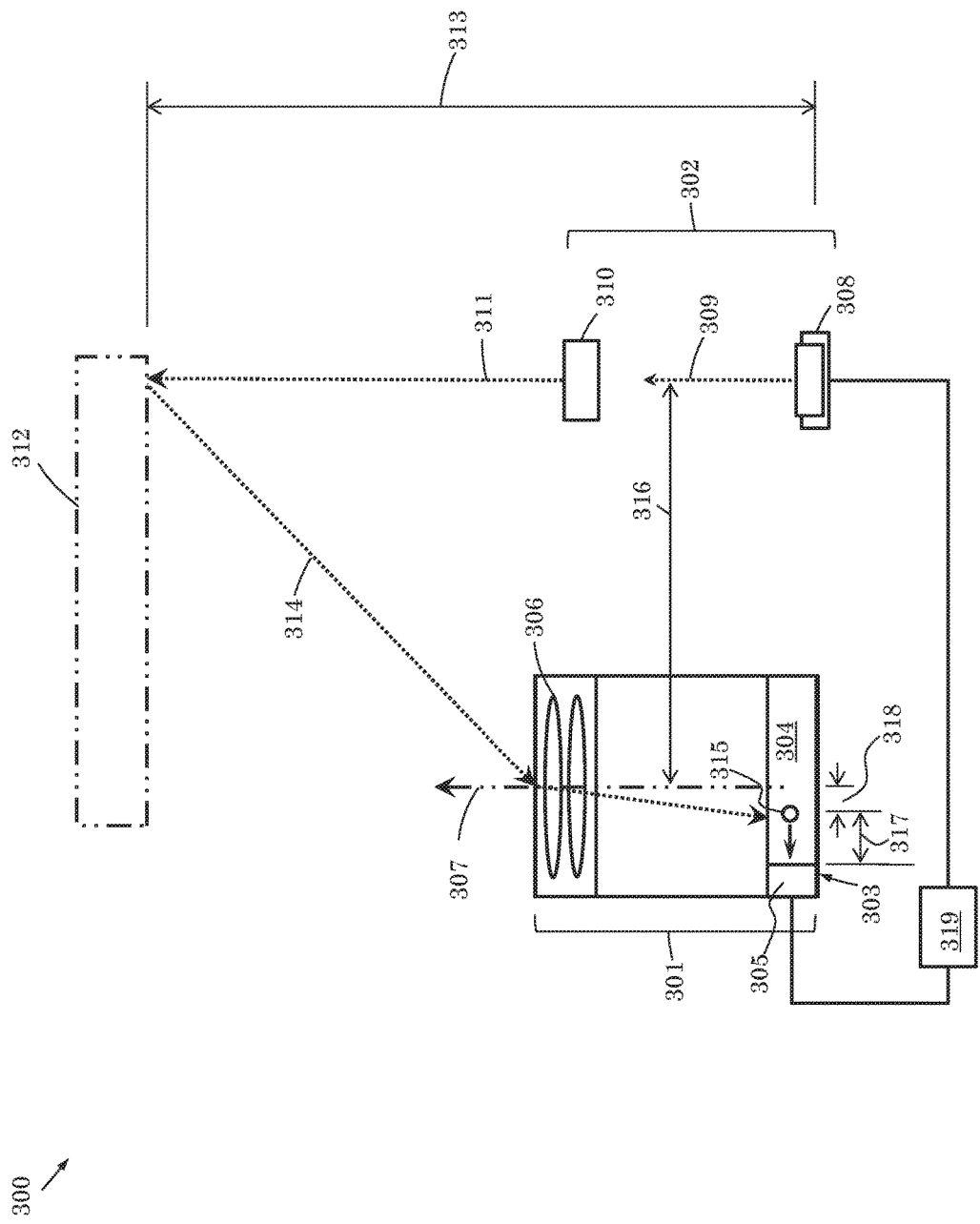
FIG. 3A depicts an example optoelectronic module operable to acquire distance data via a TOF mode and/or a TOF-triangulation mode.

FIG. 3A depicts an example of an optoelectronic module 300 with an imaging assembly 301 and an emitter 302 operable to acquire distance data via both TOF and TOF-triangulation modes. As described and depicted above in FIG. 2, the imaging assembly 301 includes a single demodulation pixel 303. The demodulation pixel 303 includes a photosensitive area 304 and a demodulation assembly 305. The imaging assembly 301 further includes an imaging optical assembly 306 having an optical axis (co-axial with an on-axis focal-length 307). The imaging assembly 301 can further include a plurality of lens elements, barrels, stops, apertures, and filters. The illumination assembly 302 includes an emitter 308. The emitter 308 can be implemented as a light-emitting diode (LED), a laser diode, a vertical-cavity surface-emitting laser (VCSEL), and/or an array of any (or combinations of any) of the aforementioned. The emitter 308 produces emitted light 309 with a particular modulation frequency ($f_{mod}$). The emitted light 309 is incident on an illumination optical assembly 310. Emitted light 309 can be any wavelength or range of wavelengths of electromagnetic radiation e.g. visible or non-visible radiation. For example, emitted light 309 can be near-, mid-, or far-infrared radiation. Further the emitted light 309 is modulated. Further the illumination optical assembly 310 can be any one of, or combinations of any one of, the following optical elements: a diffraction grating, a microlens array, a lens, a prism, a micro-prism array, a diffractive optical element or a plurality of anyone of the aforementioned or their respective combinations. The illumination optical assembly 310 can further include apertures, spacers, alignment features, and other components pertinent to its function and apparent to one of ordinary skill in the art. Light transmitted via the illumination optical assembly 310 defines an emission 311. The emission 311 can be incident on an object 312 at a distance 313. Although the optoelectronic module 300 is depicted in FIG. 3A with an illumination optical assembly 310, in other implementations the optoelectronic module 300 can be operable to produce an emission 311 without the use of the illumination optical assembly 310. For example, in some implementations the emitter 308 can include an array of VCSELs wherein the VCSELs within the array are arranged according to a pattern that can facilitate collection of distance data. Further, in some implementations the optoelectronic module 300 depicted in FIG. 3A can include an optical element in direct contact, or in contact via an adhesive, with the emitter 308.

Figure 3B:
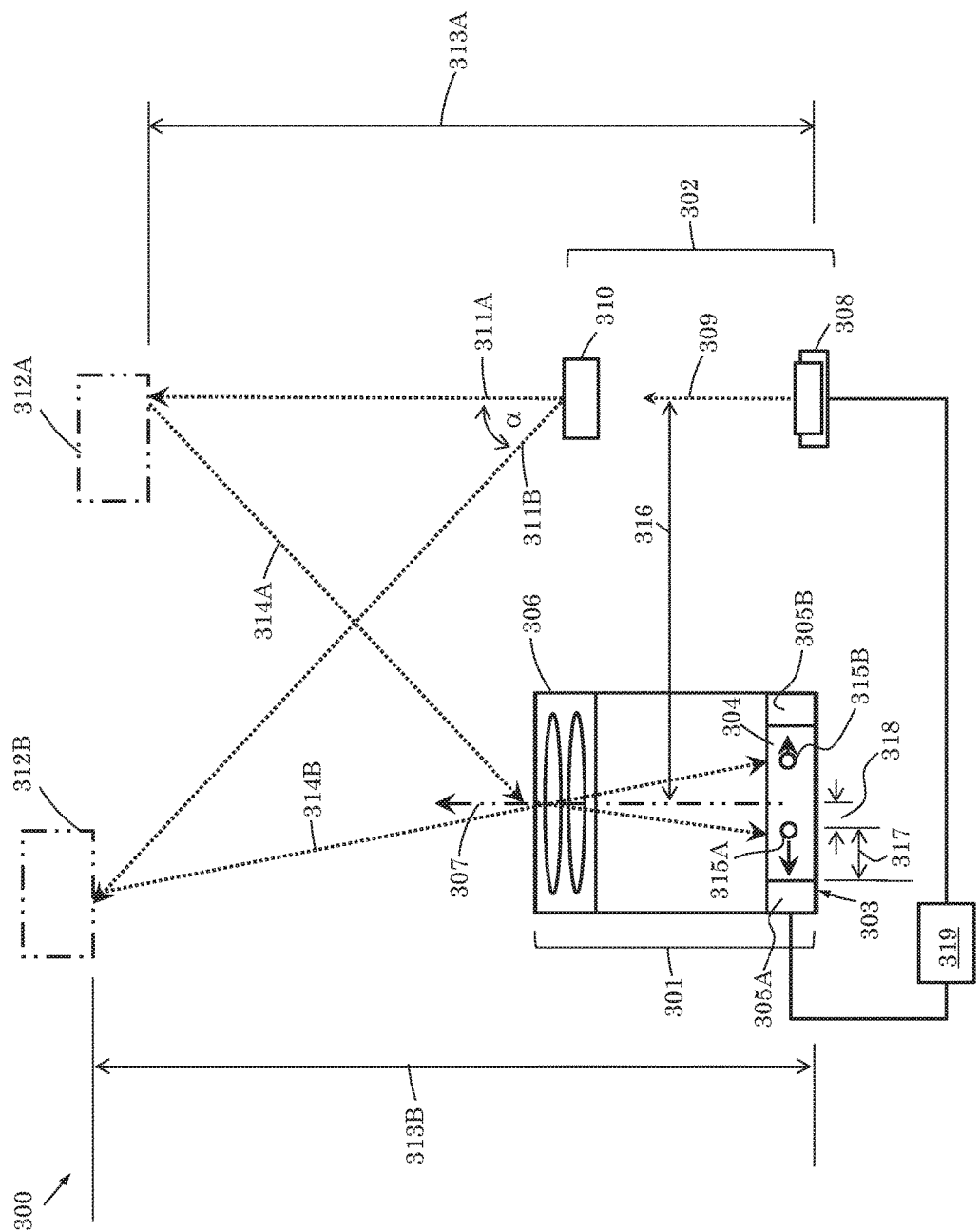
FIG. 3B depicts another example optoelectronic module operable to acquire distance data via a TOF mode and/or a TOF-triangulation mode.

The emission 311 reflects from the object 312 as reflected light 314. The reflected light 314 is focused by the imaging optical assembly 306 onto the demodulation pixel 303 wherein a photo-generated charges are generated at a location of initial charge-carrier excitation 315 (depicted as i in FIG. 1A). Charge carriers are conducted via a drift field (depicted as $E_D$ above) to the demodulation assembly 305 forming a signal. The optical axis (co-axial with the on-axis focal-length 307) is separated from the emitter 308 by a baseline distance 316 (depicted as b in FIG. 1A). The distance between the location of initial charge-carrier excitation 315 and the demodulation assembly 305 defines the distance over which the charges must travel i.e., the intra-pixel distance 317 (r as depicted in FIG. 1A and FIG. 2). Further the distance between the location of initial charge-carrier excitation 314 and the optical axis (co-axial with the on-axis focal length 307) defines the optical-axis-to-charge distance 318 (x as depicted in FIG. 1A). The example implementation further includes a processor 319. The processor 319 can be implemented as e.g., hardware, software, and/or a combination of both. In some implementations, the processor 319 can be implemented as a microprocessor and/or other logic. The processor 319 can be configured to operate the imaging assembly and the illumination assembly and can further be operable to collect and store distance data. The example implementation is operable to acquire distance data via the TOF mode, the TOF-triangulation mode, or both the TOF and TOF-triangulation modes. The processor 319 can be operable to optimize the optoelectronic module for distance data via the TOF mode, the TOF-triangulation mode or both the TOF and TOF-triangulation modes as described above. Example implementations of distance data acquisition protocols are described and depicted in FIG. 5 and FIG. 6 below. Further, although the example implementation is depicted in FIG. 3A with only one demodulation assembly 305, the demodulation pixel 303 can include multiple demodulation assemblies as depicted in FIG. 3B. Multiple demodulation assemblies 305A and 305B can proffer advantages in some instances, for example, multiple demodulation assemblies 305A and 305B can permit multiple distance data collection of multiple objects 312A and 312B. Further, multiple demodulation assemblies can permit greater use of the semiconductor substrate 304 (that is, a greater area of the semiconductor substrate 304 can be used for distance data acquisition).

FIG. 4 depicts another example of an optoelectronic module 400 operable to capture distance data via a TOF mode and a TOF-triangulation mode. The optoelectronic module 400 includes an imaging assembly 401 and an illumination assembly 402. The imaging assembly 401 includes a demodulation pixel array 403 including a plurality of discrete demodulation pixels 404 such as those disclosed in U.S. Pat. No. 7,884,310 and such as those demodulation pixels described above. The imaging assembly 401 further includes an imaging optical assembly 405 wherein the imaging optical assembly 405 possesses an optical axis (co-axial with an on-axis focal length 406). The imaging assembly 401 may further include a plurality of lens elements, barrels, stops, apertures, and filters. The illumination assembly 402 includes an emitter 407 operable to generate emitted light 408 with a particular modulation frequency ($f_{mod}$). The emitter 407 can be implemented as a light-emitting diode (LED), a laser diode, a vertical-cavity surface-emitting laser (VCSEL), and/or an array of any (or combinations of any) of the aforementioned. Emitted light 408 can be any wavelength or range of wavelengths of electromagnetic radiation (e.g., visible or non-visible radiation). Further, emitted light 408 may be near-, mid-, or far-infrared radiation, for example. The emitter 407 can be operable to generate modulated emitted light 408 such that the emitted light 408 is suitably modulated for time-of-flight applications. Emitted light 408 is incident on an illumination optical assembly 409. The illumination optical assembly 409 can be any one of, or combinations of any one of, the following optical elements: a diffraction grating, a microlens array, a lens, a prism, a micro-prism array, a diffractive optical element, other refractive optical elements, or a plurality of anyone of the aforementioned or their respective combinations. The illumination optical assembly 409 can further include apertures, spacers, alignment features, and other components pertinent to its function and apparent to one of ordinary skill in the art to which this disclosure pertains in light of the disclosure herein. The emitted light 408 incident on the illumination optical assembly 409 produces an emission 410. Although the optoelectronic module 400 is depicted in FIG. 4 with an illumination optical assembly 409, in other implementations the optoelectronic module 400 can be operable to produce an emission 410 without the use of the illumination optical assembly 409. For example, in some implementations the emitter 407 can include an array of VCSELs wherein the VCSELs within the array are arranged according to a pattern that can facilitate collection of distance data. Further, in some implementations the optoelectronic module 400 depicted in FIG. 4 can include an optical element in direct contact, or in contact via an adhesive, with the emitter 407.

Figure 4A:
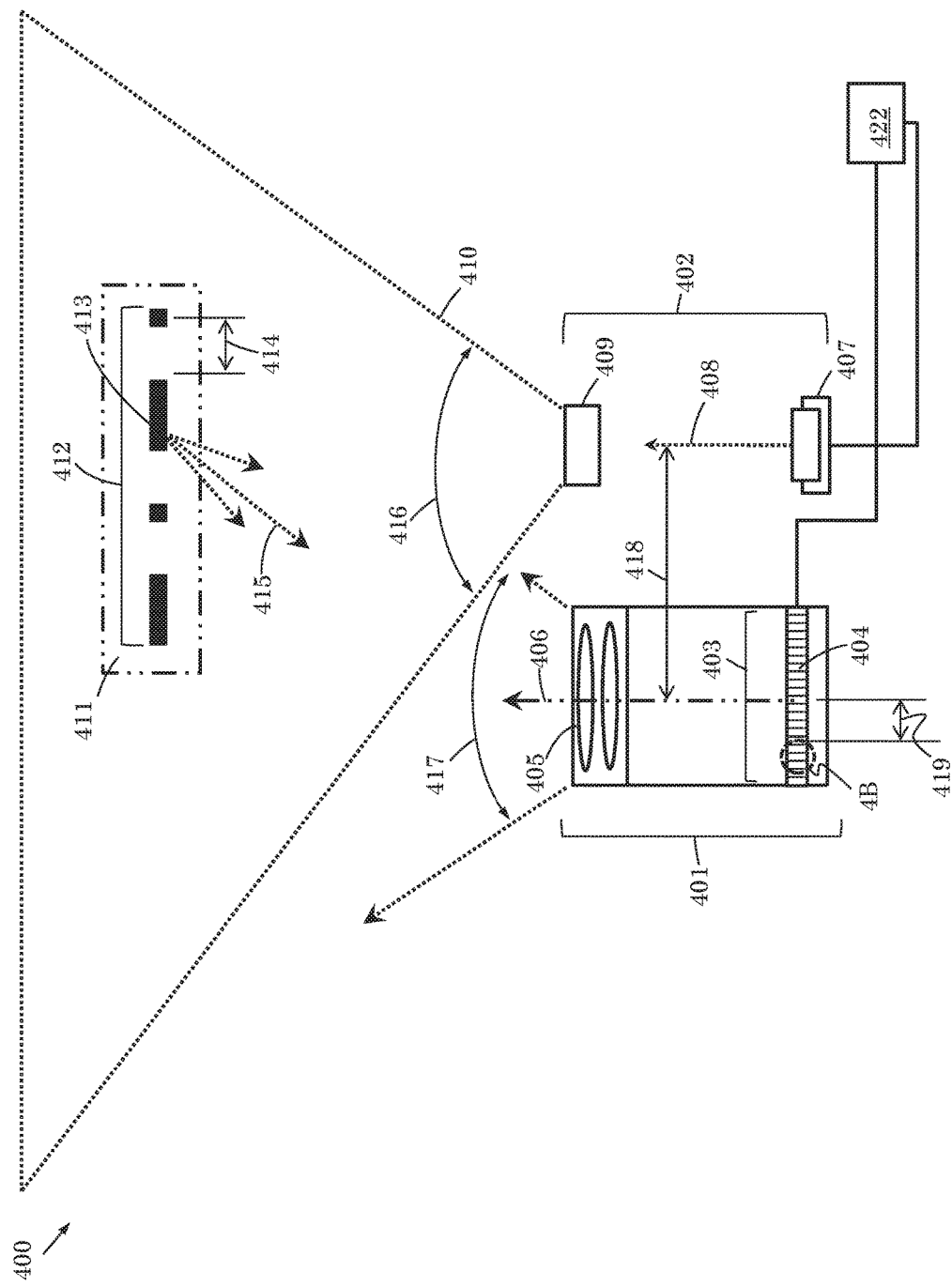
FIG. 4A depicts another example optoelectronic module operable to acquire distance data via a TOF mode and/or a TOF-triangulation mode.
Figure 4B:
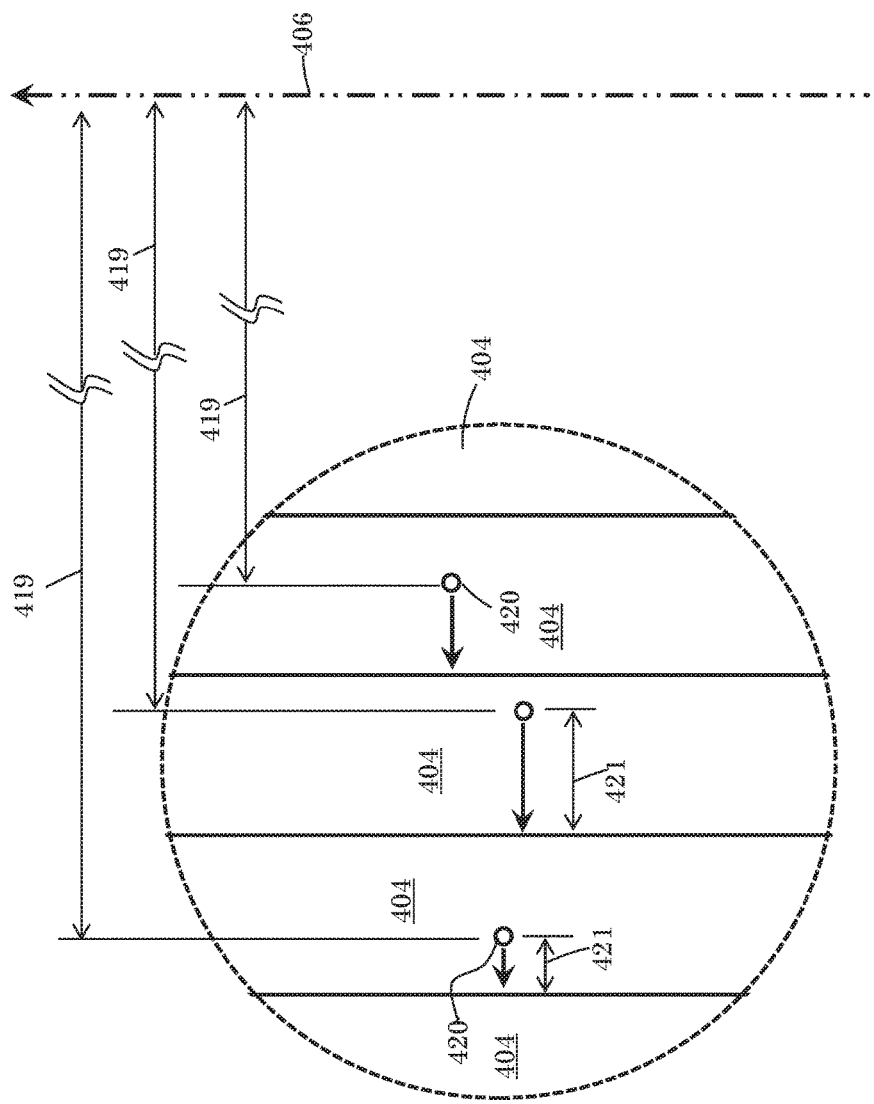
FIG. 4B depicts a magnified view of a section of the pixel array depicted din
Figure 4C:
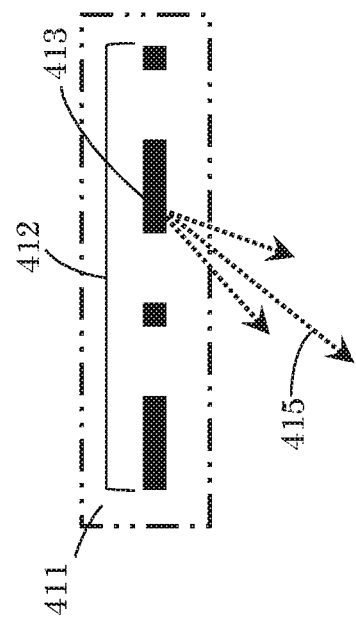
Figure 4D:
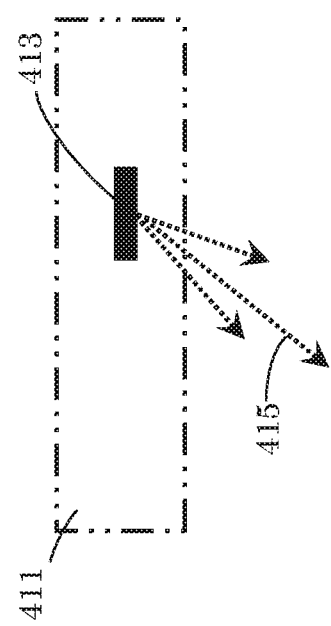

The emission 410 incident on an object 411 can produce an illumination 412 on the object 411 in a scene. The object 411 can be illuminated by the illumination 412 when at a particular distance or range of distances (e.g., between a few millimeters and several or tens or even hundreds of meters). The illumination 412 can be a single, discrete high-contrast feature 413 and/or the illumination 412 can include an array of discrete high contrast features 413. The discrete high-contrast feature 413 can be any shape, dot, line, or other geometric shape. Accordingly, the illumination 412 can take the form of a pattern of high-contrast features 413, for example, a discrete array of illuminated dots, lines, or other shapes, or combinations of the aforementioned. In general, the illumination 412 and/or the high-contrast feature(s) 413 can be configured to facilitate collection of distance data by the optoelectronic module 400. The distance 414 between the high-contrast features 413 can be strongly correlated with the intended application of the optoelectronic module 400 and the intended resolution of the optoelectronic module 400. The distance 414 between the high-contrast features 413 can be at least on the order of the dimension of the objects in the scene. Further the illumination assembly 402 can produce consecutive illuminations 412 as depicted in FIG. 4C and FIG. 4D. For example, the illumination 412 can be a single high-contrast geometric shape at an instance when TOF-triangulation data is collected (as depicted in FIG. 4C) while at another instance the illumination 412 can be a pattern of high-contrast features 413 when TOF data is collected (as depicted in FIG. 4D). In some implementations, the illumination 412 can be a homogenous illumination of the object or objects in a scene, such an illumination can be an facilities distance data acquisition via the TOF mode. Still further, the illumination optical assembly 402 can be operable such that the illumination 412 is optimized for a particular distance. For example, the illumination 412 can include a single high-contrast geometric feature at a range of about 1 cm or less from the optoelectronic module and a pattern of high-contrast features at a range greater than about 1 cm from the optoelectronic module 400.

The illumination 412 can reflect from the object 411 and produce a reflected light 415. The reflected light 415 can be focused by the imaging optical assembly 405 onto the demodulation pixel array 403. A phase-shift between the emitted light 408 and the reflected light 415 focused onto the demodulation pixel array 403 can be determined and recorded via the demodulation pixel array 403, and via external processors and circuitry. Further, the illumination optical assembly 409 produces the illumination 412 with a first field-of-view 416. In addition, the imaging optical assembly 405 possesses a second field of view 417. The second field-of-view 417 of the imaging optical assembly can overlap a portion of the first field-of-view 416 of the illumination assembly. Alternatively, the second field-of-view 417 of the imaging optical assembly can be substantially equivalent to the first field-of-view 416 of the illumination assembly. A baseline 418 (depicted as b in FIG. 1D) can be defined as the distance between the emitter 407 (or the emission axis) and the optical axis (co-axial with the on-axis focal length 406). Moreover, multiple optical-axisto-charge distances 419 (depicted as x in previous examples) can be ascribed to the distance between the optical axis (co-axial with the on-axis focal-length 406) and a location of initial charge carrier excitation 420 for each demodulation pixel 404 within the demodulation pixel array 403. A magnified view of the multiple optical-axis-to-charge distances 419 is depicted in FIG. 4B. In addition, multiple intra-pixel distances 421 defining the length over which the charge-carriers are conducted to the demodulation assembly of each pixel 404 is also depicted. A processor 422 is also depicted in FIG. 4A. The processor 422 can be implemented as e.g., hardware, software, and/or a combination of both. In some implementations, the processor 422 can be implemented as a microprocessor and/or other logic. The processor 422 can be configured to operate the imaging assembly 401 and the illumination assembly 402 and can further be operable to collect distance data. The phase-shift data ($\phi_{tof}$ and $\phi_{tri}$) can be correlated to the distance between the optoelectronic module 400 and the object 410 via a TOF mode and a TOF-triangulation mode as described above.

Figure 5:
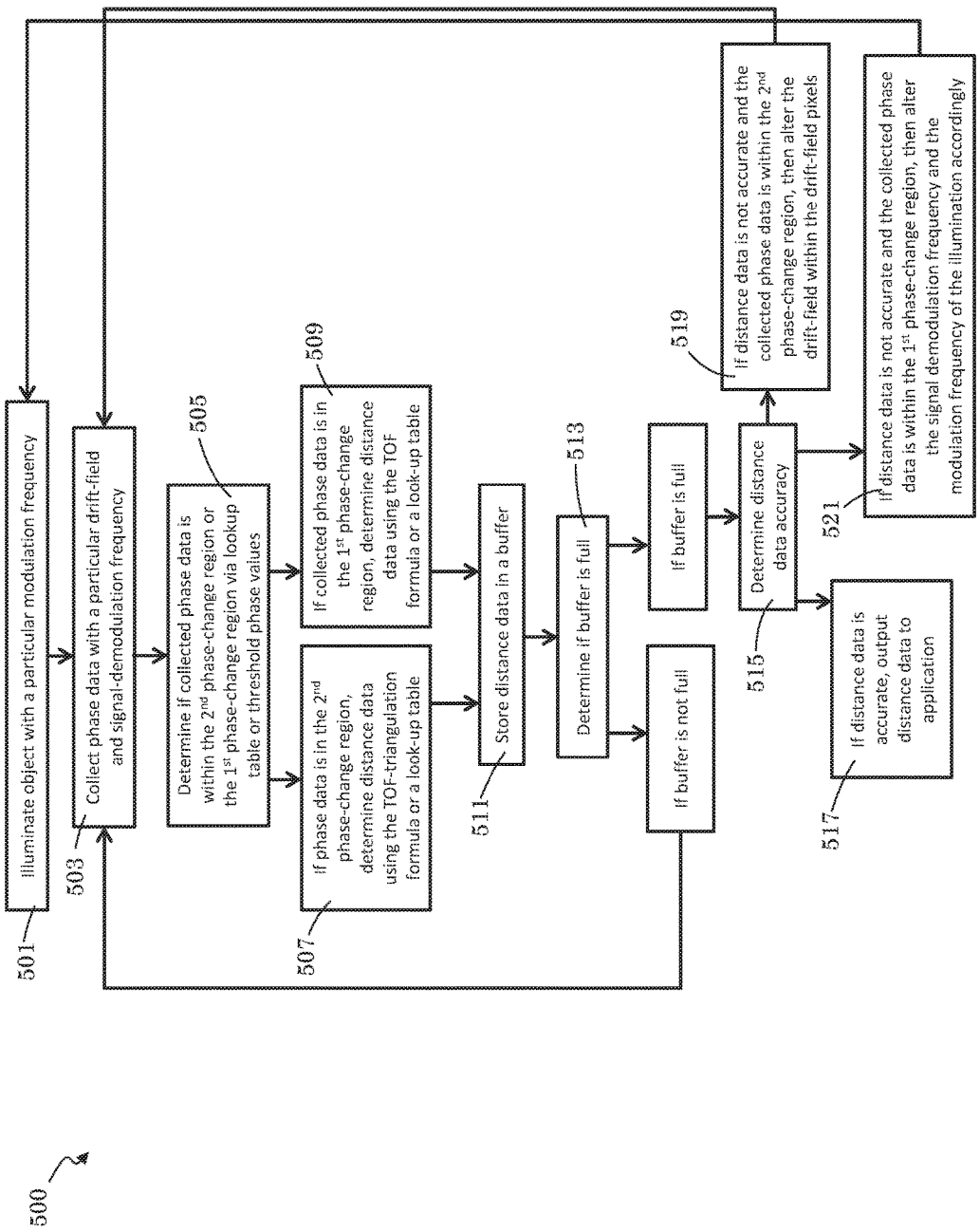
FIG. 5 depicts an example protocol describing a process-flow diagram for operating an optoelectronic module operable to acquire distance data via TOF and TOF-triangulation modes.

FIG. 5 depicts an example of operation steps 500 executed by a processor and supporting electronics such as the processor 319 or processor 422 as depicted in FIG. 3A and FIG. 4A, respectively, such that the optoelectronic module can be operated to generate distance data via the TOF and/or TOF-triangulation modes as described above. In a step 501 the processor is engaged to operate an emitter such that the emitter generates emitted light with a particular modulation frequency. Light that reflects from an object in a scene is collected by a demodulation pixel or demodulation pixel array in a subsequent step 503. Photo-generated charge-carriers are generated in a demodulation pixel (as the demodulation pixel 303 or 402A as depicted in FIGS. 3A, 3B and FIGS. 4A, 4B, respectively) and conducted through a semiconductor substrate to a demodulation assembly with a particular drift-field forming a signal. The signal can be demodulated with a particular demodulation frequency, e.g., the demodulation frequency can be substantially the same as the particular modulation frequency in some implementations. Accordingly, the demodulated signal provides phase-shift data ($\phi_{tof}$ and/or $\phi_{tri}$). In a subsequent step 505, the phase-shift data is compared to values in a lookup table or to a particular threshold value to determine if the phase-shift data is within either of the TOF region or TOF-triangulation regions (i.e., whether the phase-shift data corresponds to $\phi_{tof}$ and/or $\phi_{tri}$), for example, the first phase-change region or the second phase-change region as depicted in FIG. 1B and FIG. 1C). The aforementioned lookup table and threshold values can be functions of the drift-field within the semiconductor substrates of the demodulation pixels and/or the demodulation frequency as would be apparent to a person of ordinary skill in the art to which this disclosure pertains in light of the disclosure herein. Further, in some implementations, a particular drift-field can define the threshold value that defines the expanse of the second phase-change region. If the magnitude of the drift field is decreased, for example, the expanse of the second phase-change region can also decrease (wherein the slope of the phase-change with respect to object distance would increase as discussed above). Other variations are possible and are within the scope of the appended claims. If, in step 505, it is determined that the phase-change data fall within the second phase-change region (corresponding to data useful for the TOF-triangulation mode), the collected phase-change data can be used to calculate distance data via the TOF-triangulation mode as described above e.g., via the formulas described above (e.g., eq. 2-eq. 4 above) and/or via a look-up table in a step 507. Further, if in step 505, it is determined that the phase-change data fall within the first phase-change region (correspond to data useful for the TOF mode) the collected phase-change data can be used to calculate distance data via the TOF mode, e.g., via the formula described above (e.g., eq. 1 above) and/or via a look-up table in a step 509. The distance data generated from either of the steps 507 or 509 can be saved in a buffer in a step 511. Further, a plurality of distance data values (e.g., R) can be stored in the buffer; accordingly, in a step 513 if it is determined that the buffer is full. If the buffer is not full, the previous steps are repeated starting with step 503 and continuing through with step 513. If it is determined that the buffer is full in step 513, then the accuracy of the collected distance data is determined (e.g., via statistical analysis techniques) in a step 515. If it is determined that the distance data is accurate (e.g., a threshold value set e.g., by the user of the optoelectronic module or by the restrictions/requirements of the application), the distance data is sent to an application in a step 517 (example applications are further described below).

However, if it is determined that the distance data is not accurate, the optoelectronic module can be operable to collect accurate distance data accordingly: In a step 519, if the distance data is not accurate and the collected phase-change data is within the second phase-change region (corresponding to data useful for the TOF-triangulation mode) then the drift-field within the demodulation pixels can be altered to subsequently collect more accurate distance data. For example, the magnitude of the drift-field can be decreased in some implementations as further described above. In some implementations when the drift-field is decreased, photo-generated charge carriers may be conducted through the semiconductor substrate with a lower drift-velocity and the collected phase-shift data can possess a smaller noise component (i.e., in the distance domain) and therefore more accurate distance data can be subsequently acquired. Accordingly, upon altering the drift-field, the preceding steps can be repeated (e.g., starting with step 503) until accurate distance data is obtained, wherein the accurate distance data would be output to an application in the step 517. Further, in a step 521, if the distance data is not accurate and the collected phase-change data is within the first phase-change region (corresponding to data useful for the TOF mode) then the modulation frequency and/or demodulation frequency can be altered to subsequently collect more accurate distance data. For example, the modulation frequency/demodulation frequency can be increased in some implementations. That is, in implementations when the modulation/demodulation frequency is increased, the phase-change data within the first phase-change region (corresponding to data useful for the TOF mode) can have a smaller noise component (i.e., in the distance domain) and therefore more accurate distance data can be derived from it. Accordingly, upon altering the modulation/demodulation frequency, the preceding steps can be repeated (e.g., starting with the step 501) until accurate distance data is obtained, wherein the accurate distance data would be output to an application in step 517. Examples of applications can include displays (e.g., three-dimensional displays) where three-dimensional scenes and/or objects can be rendered using the distance data. Other example applications can include gesture or facial recognition, as might be employed for interacting and/or accessing computational or gaming systems. Still in some implementations, the distance data can be used to reconstruct three-dimensional models; that is, distance data can be used as input for three-dimensional printing systems. Still in other example applications the distance data can be used in safety-feature applications, such as are employed in automotive vehicles (e.g., the distance data can be used to determine distance between the optoelectronic module and an automotive vehicle in close proximity).

FIG. 6 depicts a series of steps 600. The steps 600 include additional and/or alternative steps that modify the example process-flow diagram depicted in FIG. 5. Additional and/or alternative steps can be implemented to overcome the multipath measurement inaccuracies described above. For example, in FIG. 6 the steps 501 through 517 proceed as described above. However, a step 623 is implemented that counts the number of repetitions/iterations that inaccurate data is collected. A maximum number of repetitions/iterations can be set, e.g., by a user of the optoelectronic module. Three further steps are depicted. In a step 625, if inaccurate data is collected and the phase-change data is within the second phase-change region (corresponding to data useful for the TOF-triangulation mode) and the maximum number of repetitions/iterations has not been reached, then the drift-field within the drift-field pixel substrates can be altered as described above in connection with step 519. In a step 627, if inaccurate data is collected and the phase-change data is within the first phase-change region (corresponding to data useful for the TOF mode), and the maximum number of repetitions/iterations has not been reached, then the signal demodulation frequency/modulation frequency can be altered as described in connection with step 521. In a step 629, if inaccurate data is collected and the phase-change data is within the first phase-change region (corresponding to data useful for the TOF mode) and the maximum number of repetitions/iterations has been reached, then the drift-field can be altered as described above. In other words, if inaccurate data has been collected via the TOF mode for multiple iterations, the step 629 is provided to re-direct the optoelectronic module to collect distance data via the TOF-triangulation mode since after some iterations the drift-field will be altered such that the collected phase data (i.e., from step 503) will subsequently fall within the second phase-change region (corresponding to data useful for the TOF-triangulation mode). These series of steps can be an advantage in some instances when, for example, the optoelectronic module encounters multi-path measurement inaccuracies, wherein the TOF mode is unable to collect suitably accurate distance data (R).

Further modifications to the steps 500 and 600 depicted in FIG. 5 and FIG. 6, respectively, are within the scope of this disclosure. For example, other steps may include optimization of the illumination. For example, if the collected phase data is within the second phase-change region (corresponding to data useful for the TOF-triangulation mode) and the subsequently collected distance data is inaccurate, a further step can include adjusting the illumination (as described above in FIG. 4C and FIG. 4D). In such an implementation, the optoelectronic module could be operable to generate an illumination with, for example, greater intensity or high-contrast features with different dimensions in order to collect accurate distance data via either the TOF mode or the TOF-triangulation mode.

The optoelectronic modules described in the above examples can further include, processors, other electrical components or circuit elements (e.g. transistors, resistors, capacitive and inductive elements) not shown though pertinent to the function of the optoelectronic modules and apparent to a person of ordinary skill in the art to which this disclosure pertains in light of the disclosure herein. Moreover, although the present invention has been described in detail with respect to various versions (disclosed above) other versions can include combinations of various disclosed features. Accordingly, other implementations are within the scope of the claims.

What is claimed is:

1. An optoelectronic module operable to capture distance data using a time-of-flight mode and operable to capture distance data using a time-of-flight-triangulation mode, the optoelectronic module comprising:
    an illumination assembly, an imaging assembly, and a processor;
    the illumination assembly operable to generate an illumination on an object at an object distance, wherein the illumination is modulated with a modulation frequency;
    the imaging assembly having an optics assembly and a demodulation pixel;
    the optics assembly having an optical axes and an on-axis focal-length, wherein the optical axis is disposed at a baseline from the illumination assembly;
    the demodulation pixel being separated from the optics assembly by an on-axis focal-length;
    the imaging assembly being operable to collect a portion of the illumination light reflected from the object, wherein a portion of the reflected light is focused on the demodulation pixel at a location of initial charge-carrier generation, the portion of the reflected light focused on the demodulation pixel forming a plurality of charges;
    the module being arranged such that a portion of the plurality of charges are conducted from the location of initial charge-carrier generation to a demodulation assembly, the distance between the location of initial charge-carrier generation and the demodulation assembly being an intra-pixel distance, wherein the portion of the plurality of charges conducted to the demodulation assembly over the intra-pixel distance produce a signal;
    the signal having a phase change, wherein the processor is operable to correlate the phase change to the intra-pixel distance;
    the processor being further operable to correlate the intra-pixel distance to the object distance via the time-of-flight-triangulation mode; and
    the processor being further operable to correlate the phase change to the object distance via the time-of-flight mode.

2. An optoelectronic module as in claim 1,
    the imaging assembly being operable to collect respective portions of the reflected light, wherein each of the respective portions of the reflected light is focused on the single demodulation pixel at a plurality of respective locations of initial charge-carrier generation, each respective portion of the reflected light focused on the single demodulation pixel respectively forming a plurality of charges at each respective location of initial charge-carrier generation;
    the module being arranged such that a plurality of charges at each respective location of initial charge-carrier generation are conducted from the respective locations of initial charge-carrier generation to respective demodulation assemblies, the respective distances between the respective locations of initial charge-carrier generation and the respective demodulation assemblies being respective intra-pixel distances, wherein the respective portions of the plurality of charges conducted to the respective demodulation assemblies over the respective intra-pixel distances form a plurality of respective signals;

the plurality of respective signals each being characterized by a respective phase change, wherein the processor is operable to correlate each respective phase change to a respective intra-pixel distance;

the processor being further operable to correlate each of the respective intra-pixel distances to an object distance via the time-of-flight-triangulation mode; and the processor being further operable to correlate each of the respective phase changes to an object distance via the time-of-flight mode.

3. An optoelectronic module as in claim 1,
the imaging assembly having a plurality of demodulation pixels; and
the plurality of demodulation pixels being separated from the optics assembly by an on-axis focal-length.

4. An optoelectronic module as in any one of claim 1, 2 or 3, in which the illumination assembly further comprises an illumination optical assembly, the illumination optical assembly including at least one of: a diffraction grating, a microlens array, a lens, a prism, a micro-prism array, a diffractive optical element, or other refractive optical elements.

5. An optoelectronic module as in any one of claim 1, 2 or 3, in which the illumination assembly is operable to generate an emission comprised of wavelengths in the infrared spectrum.

6. An optoelectronic module as in any one of claim 1, 2 or 3, in which the optoelectronic module is operable to reduce multipath multi-path errors relative to the time-of-flight-triangulation or time-of-flight modes alone.

7. An optoelectronic module as in any one of claim 1, 2 or 3, in which the processor is further operable to adjust the modulation frequency such that the phase change is optimized to determine the distance to the object via the time-of-flight mode.

8. An optoelectronic module as in any one of claim 1, 2 or 3, in which the processor is further operable to adjust the conduction of charge carriers to the demodulation assembly such that the phase change is optimized to determine the distance to the object via the time-of-flight-triangulation mode.

9. An optoelectronic module as in any one of claim 1, 2 or 3, in which the illumination comprises a discrete high-contrast feature.

10. An optoelectronic module as in any one of claim 1, 2 or 3, in which the illumination comprises an array of discrete high contrast features.

11. An optoelectronic module as in any one of claim 1, 2 or 3, in which the illumination assembly is operable to produce consecutive illuminations, wherein the illuminations are configured respectively for optimal object distance data acquisition via the time-of-flight mode or the time-of-flight-triangulation mode.

12. A method of determining distance to an object using an optoelectronic module, the method comprising:

illuminating an object at a distance from the optoelectronic module using modulated illumination;

collecting, in the module, light reflected from the object, wherein at least a portion of the reflected light is focused on a demodulation pixel in the module to produce a plurality of charges;

conducting the plurality of charges over an intra-pixel distance to a demodulation assembly in the module to produce a signal having a phase change;

determining whether collected phase-change data is within a time-of-flight-region or a time-of-flight-triangulation region;

if it is determined that the collected phase-change data is within the time-of-flight-triangulation region:
(i) correlating the phase change to the object distance via a time-of-flight-triangulation mode; and
(ii) if it is determined that distance data is not accurate, and altering a drift-field within the demodulation pixels so as to collect more accurate distance data; and if it is determined that the collected phase-change data is within the time-of-flight region:
(i) correlating the phase change to the object distance via a time-of-flight mode; and
(ii) if it is determined that distance data is not accurate, altering a demodulation frequency so as to collect more accurate distance data.

13. The method of claim 12 including adjusting a modulation frequency of the modulated illumination such that the phase change is optimized to determine the distance to the object via the time-of-flight mode.

14. The method of claim 12 including adjusting conduction of charge carriers to the demodulation assembly such that the phase change is optimized to determine the distance to the object via the time-of-flight-triangulation mode.

15. The method of any one of claim 12, 13 or 14 wherein the illumination comprises a discrete high-contrast feature.

16. The method of any one of claim 12, 13 or 14 wherein the illumination comprises an array of discrete high contrast features.

17. The method of any one of claim 12, 13, or 14 including producing consecutive illuminations, wherein the illuminations are configured respectively for optimal object distance data acquisition via the time-of-flight mode or the time-of-flight-triangulation mode.

18. The method of claim 12 wherein said determining includes comparing the phase-change data to a value in a look-up table or to a threshold value.

* * * * *